United States Patent [19]

Ruppert

[11] Patent Number: 4,763,050
[45] Date of Patent: Aug. 9, 1988

[54] DRIVING AND POSITIONING SYSTEM

[75] Inventor: Udo Ruppert, Berlin, Fed. Rep. of Germany

[73] Assignee: Deutsche Forschungs-Und Versuchsanstalt Fur Luft-Und Raumfahrt E.V., Cologne, Fed. Rep. of Germany

[21] Appl. No.: 64,263

[22] Filed: Jun. 18, 1987

Related U.S. Application Data

[63] Continuation of Ser. No. 828,118, Feb. 10, 1986, abandoned.

[51] Int. Cl.⁴ ............................................. H02K 29/08
[52] U.S. Cl. ..................................... 318/254; 310/156
[58] Field of Search ...................... 318/138, 254, 439; 310/68 R, 156, 267, 268

[56] References Cited

U.S. PATENT DOCUMENTS

| 4,130,769 | 12/1978 | Karube | 310/156 X |
| 4,242,608 | 12/1980 | Ishigaki et al. | 318/254 A X |
| 4,336,475 | 6/1982 | Morinaga et al. | 310/268 X |
| 4,396,875 | 8/1983 | Yamauchi | 318/254 |
| 4,567,391 | 1/1986 | Tucker et al. | 318/138 X |
| 4,568,862 | 2/1986 | Tassinario | 318/254 |
| 4,578,610 | 3/1986 | Kliman et al. | 310/156 |
| 4,605,874 | 8/1986 | Whiteley | 310/156 X |
| 4,629,948 | 12/1986 | Tassinario | 318/254 |
| 4,658,162 | 4/1987 | Koyama et al. | 318/254 X |

Primary Examiner—Bentsu Ro
Attorney, Agent, or Firm—Sprung, Horn, Kramer & Woods

[57] ABSTRACT

A driving and positioning system consisting of a rotor equipped with permanent magnets and of a stator with at least two windings. The windings are connected to an electronic voltage-supply circuit controlled by rotor-position sensors for commutating the current. To improve its adjustment potential by converting the system into one that can be magnetically meshed or latched, the stator is non-ferrous, the disk-shaped stator windings, which are positioned in parallel planes, are overlapped in such a way that the magnetic field generated by the windings and surrounded by the coils is essentially parallel to the magnetic field generated by the permanent magnets, and the rotor-position sensors are each integrated into both windings. A practical electronic voltage-supply circuit for controlling the system is also described. It has two sets of multiplication stages and a set of addition stages in a prescribed layout.

7 Claims, 3 Drawing Sheets

DRIVING AND POSITIONING SYSTEM

This is a continuation of application Ser No. 828,118, filed Feb. 10, 1986, now abandoned.

BACKGROUND OF THE INVENTION

The present invention relates to a driving and positioning system consisting of a rotor equipped with permanent magnets and of a stator with at least two windings, whereby the windings are connected to an electronic voltage-supply circuit controlled by rotor-position sensors for commutating the current.

A driving and positioning system of this type is described in a 1978 brochure issued by the firm of Magnetic Technology, in which it is called a brushless DC motor. The motor is intended for various applications. It has a permanent-magnet rotor and a plated stator with a stator winding that consists of two windings. Appropriately positioned rotor-position sensors, which can be Hall sensors, determine the actual rotor position at any instant. The electronic voltage-supply circuit commutates a feed current obtained from two power amplifiers to the two coils depending on the particular rotor position detected in such a way as to produce a continuous rotation.

The effects of hysteresis in the iron circuit of the stator in such a motor and the relatively high electric time constants diminish the precision that the movement of rotation can be adjusted to and make it difficult to maintain a prescribed reference position. The motor also exhibits saturation and eddy-current phenomena in the soft iron as well as preferred mechanical rotor zero positions, leading to alternating- and direct-current losses.

Also state of the art is the brushless direct-current motor with no iron in the stator described in "A high-speed high-efficiency permanent magnetic motor-generator" by A. R. Miller, published in June 1978 by the Lincoln Laboratory, MIT, Lexington, Mass. As the rotor, equipped with a number of sector-shaped permanent magnets, rotates, it induces signal voltages in the stationary stator winding. The voltages are employed to commutate the stator current in an electronic voltage-supply circuit. This brushless motor as well makes it possible to obtain only dynamic commutation during rotation, but not to establish a desired static reference position.

German Patent Application No. 2 832 387 discloses a direct-current motor without a collector and with an axial air gap. It has axially magnetized permanent magnets mounted on a rotor plate and magnetically connected to a rotor back-connection plate. The stator consists of two star-shaped drive coils superimposed like disks and positioned on a stationary back-connection plate that can be magnetized. The rotational-position detector consists of two Hall generators. The stationary and magnetizable back-connection plate constitutes not in a non-ferrous stator, whereas there are magnetizable materials present in the alternating magnetic field.

DD Pat. No. 34 431 describes a flat and slow motor intended for directly driving flywheel masses. The stator has several flat, rather trapezoidal coils. There are no rotor-position sensors. An electronic switch can be employed as a commutator, controlling the stationary coils one after another at a prescribed rate. The current can alternatively be commutated by a collector in conjunction with slip and segment rings.

SUMMARY OF THE INVENTION

The object of the present invention is to provide a driving and positioning system appropriate for a wide range of applications, especially at low temperatures, and allowing low-loss establishment of any desired reference angles of rotation, which will be as unlimited as desired and extremely stable. The system shall also maintain any prescribed reference position with high precision, consume no energy in that position, and emit maximum torque at even slight deviations from the reference position, which may be a rest position or a position that occurs during rotation. The system shall also allow high speeds at low loss.

This object is attained in accordance with the invention in a driving and positioning system of the aforesaid type wherein the stator is non-ferrous, wherein the disk-shaped stator windings I and II, which are positioned in parallel planes, are overlapped in such a way that the empty spaces inside the coils are all completely occupied by webs on other coils, whereby the magnetic field generated by the windings and surrounded by the coils is essentially parallel to the magnetic field generated by the permanent magnets, and in that the rotor-position sensors are each integrated into both windings I and II.

A system of this type, which does not involve iron in the stator, will make it possible in conjunction with an appropriate electronic voltage-supply and voltage-control circuit to position the rotor precisely at any desired reference angle $\beta$ of rotation. It will be possible to precisely establish the reference position with a powerful retentive force even after a prescribed rest position is arrived at. The rotor will behave as it rotates and in its established reference position practically as if magnetically meshed or latched, and every deviation from the prescribed in-motion or at-rest position will encounter powerful magnetic forces. The aforesaid non-ferrous design will allow extremely precise and low-loss control and provide power uptake that depends only on the deviation from the reference value.

Rotor-position sensors are sensors that generate signals that depend on a magnetic field. It is preferable to employ sensors that determine not only the magnitude but also the sign of the magnetic field and release electric output signals.

It can also be practical for the rotor-position sensors to be Hall sensors, which are in themselves known, resulting in beneficial input parameters for the electronic voltage supply and control circuit.

It is practical to provide more rotor-position sensors than windings I and II. There should be rotor-position sensors not only to allow the commutation but more than these to detect the position of the rotor and thus to provide additional rotor-motion parameters that can be processed for use in a control circuit. Since two windings make it possible to obtain the desired information with a minimum of two rotor-position sensors, there will be at least as many sensors as windings. In designs with more than two windings, however, the requisite signal values can be obtained with as many sensors as, or with less sensors than, there are windings.

One preferred embodiment of the invention employs four rotor-position sensors in conjunction with a stator winding consisting of two windings I and II and displaced by an angle $\pi/2n$, wherein n is the number of pairs of poles generated by the permanent magnets and determining the air gap that the stator windings I and II are positioned in. Specifically, the angular displacement equals $(1+4m)\cdot \pi/2n$, wherein $m=0, 1, 2, 3, \ldots$ can assume any whole-number value.

The opposing pairs of poles at the air gap can be generated by different means, especially by opposing disk-shaped permanent magnets or by the pole shoes of an iron circuit that contains one or more permanent magnets.

With respect to design it seems to be practical for the rotor to be an annular ferromagnetic support with a U-shaped cross-section and with a number of pairs of poles generated by the permanent magnets and determining the air gap that the stator windings I and II engage positioned on the opposing inner surfaces of its legs.

In this case it is practical for the U-shaped cross-section of the support to have annular surfaces that face each other and are coaxial to the axis of rotation or cylindrical surfaces that are concentric with the axis of rotation. Designing the support with parallel annular surfaces results in a system that is compact, which is practical for various applications.

Although a system of the overall type just described can be combined with various types of electronic voltage-supply circuits, the circuit that will now be described seems to be especially practical, facilitating unobjectionable magnetically meshed or latched motion on the part of the rotor and precise estabishment of prescribed reference positions.

An electronic voltage-supply circuit of this type can be practically constructed for two windings in that the output signals $U_{H1}$, $U_{H2}$, $U_{H2}$, and $U_{H4}$ from at least two rotor-position sensors are supplied to associated multiplication stages $\pi_1$, $\pi_2$, $\pi_3$, and $\pi_4$ where they are multiplied by signal values derived from the reference angle $\beta$ of rotor rotation and in that the windings I and II are connected to associated power amplifiers $L_1$ and $L_2$ that have their inputs connected to other multiplication stages $\pi_5$ and $\pi_6$ that are supplied with the output signals $U_{H1}$ and $U_{H2}$ from two rotor-position sensors and with further input signals that are constructed by addition stages $\Sigma_1$, $\Sigma_2$, and $\Sigma_3$ out of the output signals from the first multiplication stages $\pi_1$, $\pi_2$, $\pi_3$, and $\pi_4$.

One practically proven circuit employs four rotor-position sensors, displaced at an angle $\pi/2n$. A constant rotation of the rotor will yield for example a sinusoidal curve for the field that rotates along with the pairs of poles and field-proportional sinusoidal Hall-sensor signals, with each signal displaced at an angle $\pi/4$ from its predecessor. This results in the signals from Hall sensors $H_1$, $H_2$, $H_3$, and $H_4$, depending on the relative angle $\alpha$ of rotation, of $U_{H1} = C\cdot \sin(n\alpha/2)$
$U_{H2} = C\cdot \sin(n\alpha/2 + \pi/4)$
$U_{H3} = C\cdot \sin(n\alpha/2 + \pi/2)$
$U_{H4} = C\cdot \sin(n\alpha/2 + \frac{3}{4}\pi)$ where C is a constant numerical value.

The output signal from each of the four Hall sensors is supplied to an associated multiplication stage, where it is multiplied by various signal values a, b, c, and d, which, as functions of reference angle $\beta$ of rotation, have the dimensions $a = \cos(n\alpha/2)$
$c = \cos(n\alpha/2 + \pi/4)$
$b = \cos(n\alpha/2 + \pi/2)$
$d = \cos(n\alpha/2 + \frac{3}{4}\pi)$ As long as actual angle $\alpha$ of rotation differs from reference angle $\beta$ of rotation, therefore, the electronic voltage-supply circuit will supply load currents in accordance with the direction of rotation through the power amplifiers associated with the corresponding windings. The magnetic field generated by the activated windings will attempt decrease the control deviation.

Other appropriate elements can also be employed instead of Hall sensors to detect the positions. Another design, in which rotor-position signals are generated by a separate and additional system of permanent magnets or by a different type of signal-generator system can also be employed instead of sensing carried out by rotor-position sensors integrated into the windings.

A system with a non-ferrous stator and disk-shaped stator windings positioned in parallel planes will, in conjunction with the aforesaid electronic voltage-supply circuit, unobjectionably position a component that is to be driven and that is connected to the driving unit, a support for instance. Magnetically meshing or latching the rotor as it rotates enables powerful forces to be transmitted to the driven component even at slow speeds or at rest, forces that will compel its positioning within the prescribed time function of the reference angle of rotation.

Some preferred embodiments of the invention will now be described with reference to the attached schematic drawings, wherein

DETAILED DESCRIPTION OF THE PRFERRED EMBODIMENTS

Figure 1:
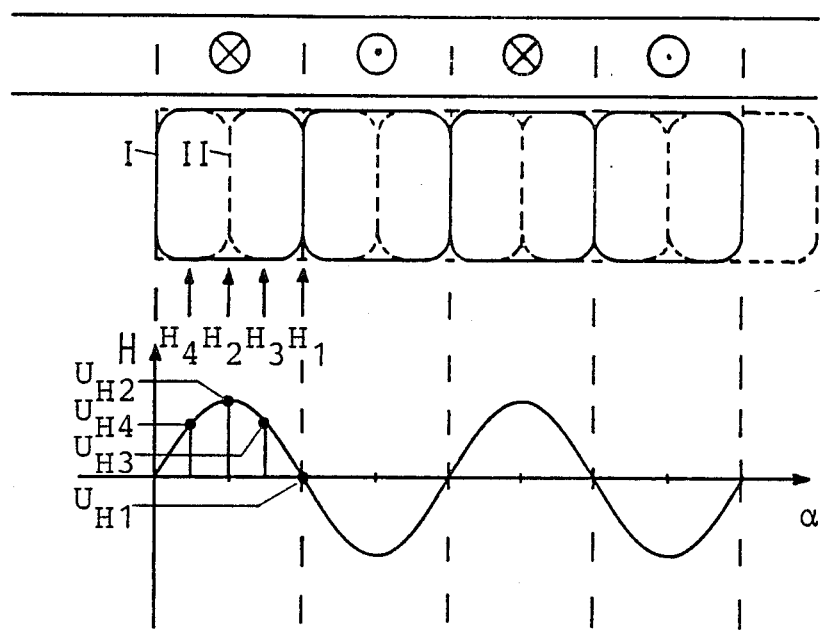
FIG. 1 is a developed view of the rotor and stator winding represented as a function of angle $\alpha$ of rotation.

The top of FIG. 1 shows two mutually displaced windings I and II below the poles (X) and (.) of a rotor. Since windings I and II overlap in a practical way, the empty space inside the coils of one winding is completely occupied by the webs of the coils of the other winding. The empty space inside the coils is accordingly exploited in a practical way. Hall sensors $H_1$, $H_2$, $H_3$, and $H_4$ are integrated into the windings in the positions indicated relative to the windings or to their coils. The bottom of FIG. 1 shows the strength of the magnetic field generated by the rotor poles, specifically in a static situation—at time t=0, resulting in Hall-sensor signals that correspond to the sinusoidal curve of field strength as a function of angle $\alpha$ of rotation.

Figure 2:
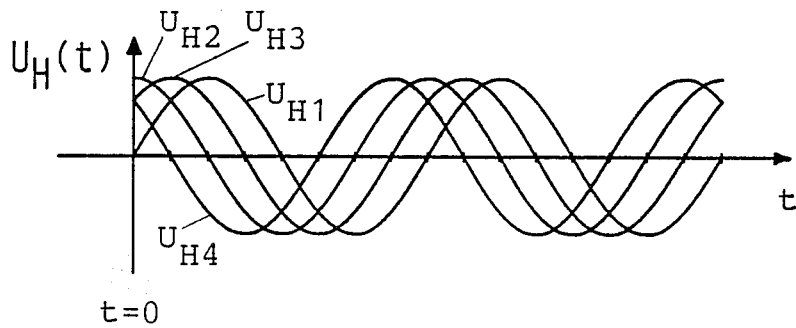
FIG. 2 is a graph with respect to time of the activity of the Hall-sensor signals in FIG. 1 at constant rotation.

FIG. 2 illustrates the dynamic situation with the rotor rotating at constant speeds, each as the function of a particular Hall-sensor signal over time.

Figure 3:
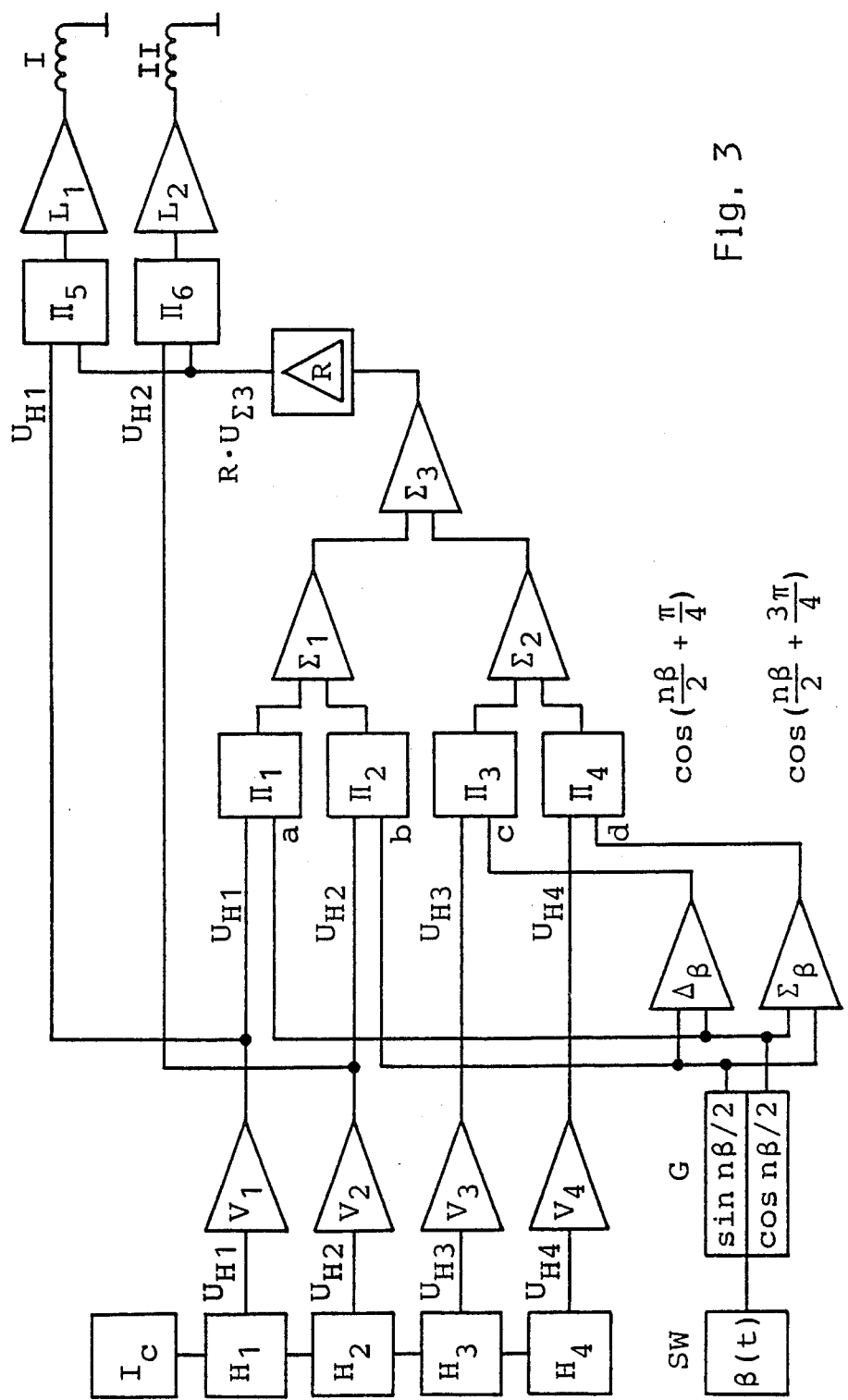
FIG. 3 is a block diagram illustrating how the Hall-sensor signals from FIGS. 1 or 2 are processed.

The block diagram in FIG. 3 illustrates how the Hall-sensor signals are further processed. The four Hall sensors $H_1$, $H_2$, $H_3$, and $H_4$ are constantly supplied with current from a source $I_C$. The four Hall-sensor signals $U_{H1}$, $U_{H2}$, $U_{H3}$, and $U_{H4}$ are appropriately amplified by downstream amplifiers $V_1$, $V_2$, $V_3$, and $V_4$ and supplied to multiplication stages $\pi_1$, $\pi_2$, $\pi_3$, and $\pi_4$, where they are multiplied by various signals a, b, c, and d in such a way that signals $a \cdot U_{H1}$, $b \cdot U_{H2}$, $c \cdot U_{H3}$, and $d \cdot U_{H4}$ appear at the multiplication-stage outputs.

Signals a, b, c, and d are functions of prescribed reference angle $\beta$ of rotation and are generated from the functions sin $n\beta/2$ and cos $n\beta/2$ in such a way as to result in the equations $a = \cos(n\beta/2)$
$c = \cos(n\beta/2 + \pi/4)$
$b = \cos(n\beta/2 + \pi/2)$
$d = \cos(n\beta/2 + \frac{3}{4}\pi)$ The output signals from multiplication stages $\pi_1$, $\pi_2$, $\pi_3$, and $\pi_4$ are then added together in addition stages $\Sigma_1$, $\Sigma_2$, and $\Sigma_3$, and the total supplied through a servo amplifier R to two other multiplication stages $\pi_5$ and $\pi_6$, which Hall-sensor signals $U_{H1}$ and $U_{H2}$ are also directly supplied to. A signal that activates a power amplifier $L_1$ connected to winding I is then constructed from the product of $U_{H1}$ and from the total signal from $\Sigma_3$ amplified in power amplifier R. A signal that activates another power amplifier $L_2$ that supplies winding II is similarly generated through multiplication stage $\pi_6$ as the product of Hall-sensor signal $U_{H2}$ and the signal $\Sigma_3$ amplified in servo amplifier R.

Amplifiers $V_1$, $V_2$, $V_3$, and $V_4$ should be stable, low-noise, and rapid proportional amplifiers. Servo amplifier R can be employed to determine the effect of total output signal $\Sigma_3$ on each of the products to be constructed in downstream multiplication stages $\pi_5$ and $\pi_6$.

The prescribed reference angle $\beta$ of rotor rotation can be established in a reference generator SW as a function over time. In the simplest case, voltages corresponding to a specific reference angle can be tapped from a voltage divider.

For a single motion is $\beta = f(t)$, and $\beta(t) = 2\pi \nu t$ for continuous rotation at a speed of $2\nu/n$, where $\nu$ is the frequency of oscillation of singals a, b, c, and d. Sin $(n\beta/2)$ and cos $(n\beta/2)$ are constructed in a computer G from prescribed reference angle $\beta$ of rotation and supplied to an adding amplifier $\Sigma\beta$ and to a differential amplifier $\Delta\beta$, which generate one of the input parameters of initial multiplication stages $\pi_3$ and $\pi_4$. Each of the other input parameters consists of a Hall-sensor signal $U_{H3}$ and $U_{H4}$. Thus, aforesaid signals a, b, c, and d will be at the initial inputs of initial multiplication stages $\pi_1$, $\pi_2$, $\pi_3$, and $\pi_4$. The output signals from adding amplifier $\Sigma\beta$ and differential amplifier $\Delta\beta$ are cos $(n\beta/2 + \pi/4)$ and cos $(n\beta/2 + \frac{3}{4}\pi)$, specifically c and d.

The four Hall sensors in this circuitry sense the instantaneous local field activity in relation to one coil of the windings and compare it to a theoretical reference curve obtained from reference angle of rotation $\beta$. The electronic controls activate windings I and II in such a way that both curves coincide as much as possible in a state of equilibrium. Thus, actual angle $\alpha$ of rotor rotation will coincide with each prescribed reference angle $\beta$, which can be a constant or a presribed reference function with respect to time. Since the Hall sensors can sense with practically infinite resolution, any desired angle $\alpha$ of rotor rotation can be established with high resolution, and precisely guided motions can be carried out because, at the slightest deviation of actual angle $\alpha$ from an instantaneous reference angle $\beta$, a maximal torque will be generated to readjust it.

Thus, the rotor will always be in an electrodynamically meshed or latched state, with the particular position established and shifted electronically. Since the meshed position can also rotate at constant speed, speeds that are as low as possible can be established at full torque. The electronic meshing or latching resulting from the special non-ferrous design of the system's coils in conjunction with the particular electronic voltage-supply circuit far exceeds mechanical meshing or latching in precision, reproduceability, and life. Since the rotor has no preferred mechanical zero position, electric power will essentially be consumed only when deflecting forces act from the reference position.

The absolute rotor position is initially dependent on the number of poles.

If the prescribed maximal torque is exceeded, the drive will disengage and can assume one of the other n/2 possible catch positions distributed around the circumference. In applications in which this approach is impermissible, absolute definition can be attained with additional known means (identification and count-off of the meshing situations) or by installing a permanent-magnet system with n=2. The system can also be operated like any other drive system in normal servo function by means of external position indication as well as converted to ungoverned motor operation. Combination with other analog or digital encoders is also possible.

Figure 4:
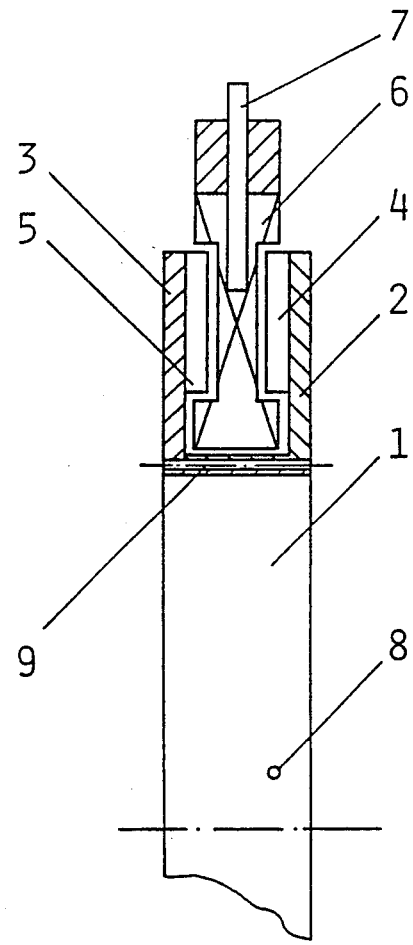
FIG. 4 illustrates an embodiment in which the pairs of poles are positioned on annular sufaces on the rotor.
Figure 5:
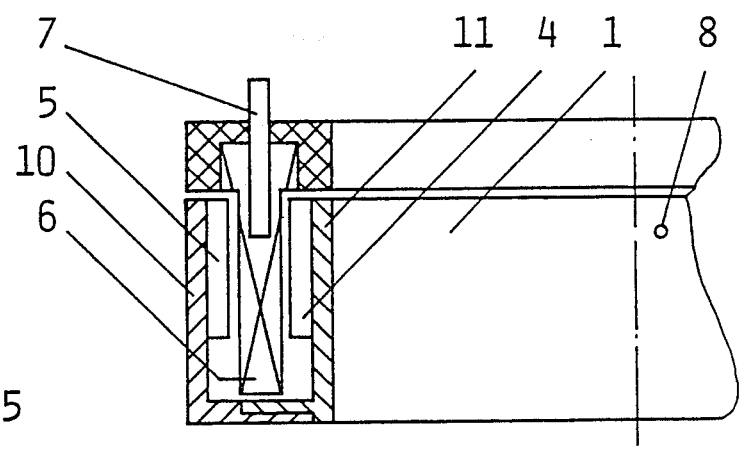
FIG. 5 illustrates an embodiment in which the pairs of poles are positioned in cylindrical surfaces on the rotor.

FIGS. 4 and 5 illustrate two possible embodiments of the physical driving and positioning system. The ferromagnetic support for the rotor 1 illustrated in FIG. 1 is in the form of a coil and supports two annular disks 2 and 3 with permanent magnets that create a pair 4 and 5 of poles mounted on its inner surface. A non-ferrous, stationary, and disk-shaped stator winding 6 engages the air gap between pair 4 and 5 of poles and annular disks 2 and 3. Stator winding 6 including windings I and II has a cross-section in the shape of an I and includes the coils, cast out of resin, of two windings I and II along with Hall-sensor supports 7, which are ajustable in position. A shaft that is to be driven is directly inserted in a central recess 8 in rotor 1, which it is connected to in such a way that it cannot rotate relative to rotor 2. In the particular embodiment illustrated, a stop pin 9 secures annular disks 2 and 3 in such a way that they cannot rotate.

The support illustrated in FIG. 5 has two concentric annular cylindrical surfaces 10 and 11 that support a pair 4 and 5 of poles. The stator winding 6 including windings I and II in this embodiment is also non-ferrous. It has a cross-section in the shape of a T, but cylindrical. Hall sensors 7, which are adjustable in position, are integrated into windings cast out of artificial resin.

One essential feature of the invention is that the rotor-position sensors are integrated into both windings, resulting in an especially favorable shape for the signals generated in the rotor-position sensors by the permanent magnets. In the present embodiment this is ensured by overlapping the windings in parallel planes. This design also makes it possible to position the sensors in relation to the windings in such a way that the upstream effect of the windings on the position sensors associated with them by means of the electric control circuit remains slight.

It will be appreciated that the instant specification and claims are set forth by way of illustration and not limitation, and that various modifications and changes may be made without departing from the spirit and scope of the present invention.

What is claimed is:

1. In a driving and positioning system having a rotor with permanent magnets, a stator with at least two windings, rotor-position sensors, an electronic voltage-supply circuit connected to the windings and controlled by the rotor-position sensors for commutating the current to the windings, the improvement wherein the stator is non-ferrous, the windings are disk-shaped and comprise coils including webs and empty spaces and are positioned in parallel planes and are overlapped such that the empty spaces inside the coils are all completely filled by webs, and wherein the rotor-position sensors are integrated into the at least two windings.

2. The system as in claim 1, wherein the rotor-position sensors are Hall sensors.

3. The system as in claim 1, wherein the number of rotor-position sensors is greater than the number of windings.

4. The system as in claim 1, comprising four rotor-position sensors in conjunction with a stator winding consisting of two windings and displaced by an angle $\pi/2n$, wherein n is the number of pairs of poles generated by the permanent magnets of the rotor which form an air gap that the stator windings are positioned in.

5. In a driving and positioning system having a rotor with permanent magnets, a stator with at least two windings, rotor-position sensors, an electronic voltage-supply circuit connected to the windings and controlled by the rotor-position sensors for commutating the current to the windings, the improvement wherein the rotor is an annular ferromagnetic support with a U-shaped cross-section and with a number of pairs of poles generated by the permanent magnets of the rotor which form an air gap that the stator windings engage and positioned on the opposing inner surfaces of the legs of the U-shaped cross-section, the stator is non-ferrous, the windings are cylindrical and comprise coils including webs and empty spaces and are positioned in parallel planes and are overlapped such that the empty spaces inside the coils are all completely filled by webs, and wherein the rotor-position sensors are integrated into the at least two windings.

6. The system as in claim 5, wherein the U-shaped cross-section of the support has annular surfaces that face each other and are coaxial to the axis of rotation.

7. The system as in claim 5, wherein the U-shaped cross-section of the support has cylindrical surfaces that face each other and are concentric with the axis of rotation.

* * * * *

UNITED STATES PATENT AND TRADEMARK OFFICE
CERTIFICATE OF CORRECTION

PATENT NO. : 4,763,050

DATED : August 9, 1988

INVENTOR(S) : Udo Ruppert

It is certified that error appears in the above-identified patent and that said Letters Patent is hereby corrected as shown below:

| | |
|---|---|
| Title Page, under "[63]" | Insert --[30] FOREIGN APPLICATION PRIORITY DATA...Germany... P 35 04 681...Feb. 12, 1985-- |
| Col. 3, lines 65, 66, 67, 68 | Delete "$\alpha$" in four instances and substitute --$\beta$-- |
| Col. 3, line 56 | Delete "$U_{H2}$" and substitute --$U_{H3}$-- |
| Col. 3, line 57 | Delete "$U_{H3}$" and substitute --$U_{H2}$-- |

Signed and Sealed this

Eighteenth Day of April, 1989

Attest:

DONALD J. QUIGG

*Attesting Officer*       *Commissioner of Patents and Trademarks*